(12) United States Patent
Sparks

(10) Patent No.: US 9,972,123 B2
(45) Date of Patent: May 15, 2018

(54) GENERATING 3D MODELS WITH SURFACE DETAILS

(71) Applicant: OTOY, Inc., Los Angeles, CA (US)

(72) Inventor: Clay Sparks, Los Angeles, CA (US)

(73) Assignee: OTOY, INC., Los Angeles, CA (US)

( * ) Notice: Subject to any disclaimer, the term of this patent is extended or adjusted under 35 U.S.C. 154(b) by 396 days.

(21) Appl. No.: 14/676,274

(22) Filed: Apr. 1, 2015

(65) Prior Publication Data

US 2016/0292911 A1 Oct. 6, 2016

(51) Int. Cl.
| | |
|---|---|
| *G05B 19/4097* | (2006.01) |
| *G05B 19/4099* | (2006.01) |
| *G06T 15/50* | (2011.01) |
| *B29C 64/10* | (2017.01) |
| *B29C 64/165* | (2017.01) |
| *B29C 64/106* | (2017.01) |

(Continued)

(52) U.S. Cl.
CPC .............. *G06T 15/50* (2013.01); *B29C 64/10* (2017.08); *B29C 64/106* (2017.08); *B29C 64/112* (2017.08); *B29C 64/118* (2017.08); *B29C 64/165* (2017.08); *B29C 67/0088* (2013.01); *G05B 15/02* (2013.01); *G06T 17/00* (2013.01); *B33Y 50/02* (2014.12)

(58) Field of Classification Search
CPC ..... B29C 64/10; B29C 64/106; B29C 64/112; B29C 64/118; B29C 64/165; B33Y 10/00; B33Y 50/00; B33Y 50/02; G05B 19/18; G05B 19/4097; G05B 19/4099; G06F 17/50; G06T 15/10; G06T 15/50; G06T 17/00

USPC .......... 264/308; 345/420, 426, 619; 700/98, 700/118, 119
See application file for complete search history.

(56) References Cited

U.S. PATENT DOCUMENTS

| | | | |
|---|---|---|---|
| 2003/0011596 A1 | 1/2003 | Zhang et al. | |
| 2007/0146372 A1* | 6/2007 | Gee ......................... | G06T 13/00 345/474 |

(Continued)

FOREIGN PATENT DOCUMENTS

| | | |
|---|---|---|
| JP | 2010231347 A | 10/2010 |
| KR | 1020110092027 A | 8/2011 |

OTHER PUBLICATIONS

Julio Juárez (Riddlaz C.) "Leaf Project" http://www.3dtotal.com/team/Tutorials/leafproject/leaf_6.php; 3 pages.

(Continued)

*Primary Examiner* — Leo B Tentoni
(74) *Attorney, Agent, or Firm* — James J. DeCarlo; Greenberg Traurig, LLP

(57) ABSTRACT

Systems and methods for generating a model of an object that includes the surface reflectance details of the object are disclosed. The surface reflectance properties of the object comprising at least separate components for the object diffuse data and the object specular data are received. A 3D model of the object is generated wherein the reflectance properties of the model are configured based on the reflectance properties of the object surface. The object diffuse data determines the color to be used in generating the model and the object specular data determines one of the attributes of the coating for the model or the material to be used for generating the model.

9 Claims, 10 Drawing Sheets

(51) Int. Cl.
*B29C 64/118* (2017.01)
*B29C 64/112* (2017.01)
*B29C 67/00* (2017.01)
*G05B 15/02* (2006.01)
*G06T 17/00* (2006.01)
*B33Y 50/02* (2015.01)

(56) References Cited

U.S. PATENT DOCUMENTS

| | | | |
|---|---|---|---|
| 2010/0026743 A1* | 2/2010 | Van Thillo | B41J 2/175 347/9 |
| 2013/0100092 A1* | 4/2013 | Danks | B33Y 50/00 345/204 |
| 2013/0271461 A1 | 10/2013 | Baker | |
| 2015/0022639 A1 | 1/2015 | Blassnig et al. | |
| 2015/0079327 A1* | 3/2015 | Kautz | B33Y 50/02 264/308 X |

OTHER PUBLICATIONS

International Search Report to corresponding International Application No. PCT/US16/24315, dated Jul. 20, 2016; 3 pages.

* cited by examiner

GENERATING 3D MODELS WITH SURFACE DETAILS

BACKGROUND

Traditional two dimensional printers used by computers print out data row-by-row on a paper. When this method of printing was extended to print multiple layers one on top of another, it enabled printing of three dimensional models. Three dimensional (3D) printing is a process by which a computer model is translated into a physical object. Unlike traditional processes that create models via primarily subtractive processes of chiseling away material, 3D printing is an additive process wherein the physical object is built up with multiple layers of materials. As a result there is less wastage of material in addition to eliminating expensive re-tooling required to produce different models under the traditional subtractive processes. The additive processes are carried out by a 3D printer under the control of a computing device that comprises hardware and software modules to carry out the printing procedure. This enables obtaining models quickly and economically before producing the actual object in a factory. As the technology matured, 3D printers are increasingly used not only to print simple models but also to print various products such as models of sophisticated machinery parts, pharmaceutical tablets or even dental crowns used by dentists.

SUMMARY

This disclosure is related to systems and methods for generating models of objects that accurately convey the surface details of the surface of an object they model. A method of obtaining 3D printed models is disclosed in accordance with some embodiments. The method comprises receiving, at a printing device comprising a processor, reflectance properties comprising at least disparate components associated with diffuse data and specular data of an object surface. 3D model specular data for a surface of a 3D model of the object is determined by the device using the object specular data. The determination of the 3D model specular data can be based on determining correspondence of respective 3D model specular data of a surface portion of the 3D model with respective object specular data of a corresponding portion of the object surface. The 3D model of the object is generated by the device so that the surface of the 3D model comprises the 3D model specular data corresponding to the object specular data.

In some embodiments, determining the specular data for each surface portion of the 3D model further comprises receiving, by the processor, at least two pelt maps of the object surface, determining, by the processor from the one of the received pelt maps, the 3D model specular data and determining color information of the 3D model from another one of the pelt maps. The 3D model of the object is printed based on the pelt maps.

In some embodiments, generating the 3D model based on the 3D model specular data further comprises printing, by the device, a first 3D model of the object comprising the surface portions wherein the color of the surface portions based on the diffuse data and overlaying a reflective coating on the surface portions of the first 3D model based on the respective 3D model specular data of the 3D model surface portion being printed. A reflectance of the coating to be applied to the surface portions of the first 3D model can be proportional to the respective 3D model specular data.

In some embodiments, generating the 3D model further comprises selecting, by the device for each surface portion of the 3D model at least one printing material from a plurality printing materials, wherein the selection of the printing material based at least on the respective diffuse data and specular data of the surface portion of the 3D model being generated. Each surface portion of the 3D model of the object is printed from the selected printing material. In some embodiments, the at least one printing material is generated via a combination of a clear printing material with a colored printing material. The clear printing material and the colored printing material are combined in a proportion based on the respective specular data corresponding to the surface portion being printed.

An apparatus for generating 3D printed models is disclosed in some embodiments. The apparatus comprises a processor and non-transitory storage medium comprising programming logic for execution by the processor. In some embodiments, the programming logic comprises data receiving logic that receives reflectance properties comprising at least disparate components associated with diffuse data and specular data of an object surface. Data determining logic comprised in the programming logic determines using the object specular data, 3D model specular data for a surface of a 3D model of the object. The determination of the 3D model specular data can be based on determining correspondence of respective 3D model specular data of a surface portion of the 3D model with respective object specular data of a corresponding portion of the object surface. Model generating logic drives a 3D printer to generate the 3D model of the object, the surface of the generated 3D model being constructed by the device to comprise the 3D model specular data corresponding to the object specular data.

In some embodiments, the data determining logic further comprises logic for determining, by the processor from at least two pelt maps, the 3D model color information and specular data wherein reflectance properties comprise a specular map and a diffuse map of the object surface. The model generating logic further comprises printing logic that prints the 3D model of the object based on the diffuse map.

In some embodiments, the model generating logic further comprises printing logic that prints a first 3D model of the object comprising the 3D model surface portions, a color of the 3D model surface portions being determined from the diffuse map and overlaying logic that overlays a reflective coating on each of the surface portions of the first 3D model based on the respective 3D model specular data of the 3D model surface portion being printed. The overlaying logic further comprises reflectance determining logic that determines a reflectance of the coating to be applied to the surface portions of the first 3D model, the respective reflectance of coating applied to the 3D model surface portion can be proportional to a value of the respective 3D model specular data.

In some embodiments, the model generating logic further comprises material selecting logic that selects for each surface portion of the 3D model, at least one printing material from a plurality printing materials, the selection of the printing material based at least on the respective specular data of a surface portion of the object corresponding to the surface portion of the 3D model being generated. Printing logic is also comprised that prints each surface portion of the 3D model of the object from the selected printing material.

In an embodiment, non-transitory computer-readable storage medium comprising processor-executable instructions is disclosed. The processor executable instructions comprise instructions for receiving reflectance properties comprising at least disparate components associated with diffuse data and specular data of an object surface, determining using the object specular data, 3D model specular data for a surface of a 3D model of the object and generating the 3D model of the object. The determination of the 3D model specular data can be based on determining correspondence of respective 3D model specular data of a surface portion of the 3D model with respective object specular data of a corresponding portion of the object surface. The instructions include instructions for configuring by the device, the surface of the 3D to comprise the 3D model specular data corresponding to the object specular data.

In some embodiments, the instructions for determining the specular data for each surface portion of the 3D model further comprise instructions for receiving at least two pelt maps of the object surface and determining from the received pelt maps, the 3D model specular data. The 3D model of the object can be printed based on the pelt maps.

In some embodiments, the instructions for generating the 3D model further comprise instructions for printing a first 3D model of the object comprising the surface portions wherein a color of the surface portions of the first 3D model based on RGB (Red Green Blue) values from the diffuse data and overlaying a reflective coating on each of the surface portions of the first 3D model based on the respective 3D model specular data of the 3D model surface portion being printed. The instructions for overlaying the coating on the first 3D model further comprises instructions for determining a reflectance of the coating to be applied to each of the surface portions of the first 3D model, the respective reflectance of coating applied each of the surface portion being proportional to a value of the respective specular data.

In some embodiments, the instructions for generating the 3D model further comprise instructions for selecting for each surface portion of the 3D model, at least one printing material from a plurality printing materials, the selection of the printing material is based at least on the respective specular data of a surface portion of the object corresponding to the surface portion of the 3D model being generated. Each surface portion of the 3D model of the object is printed from the selected printing material in accordance with the instructions.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
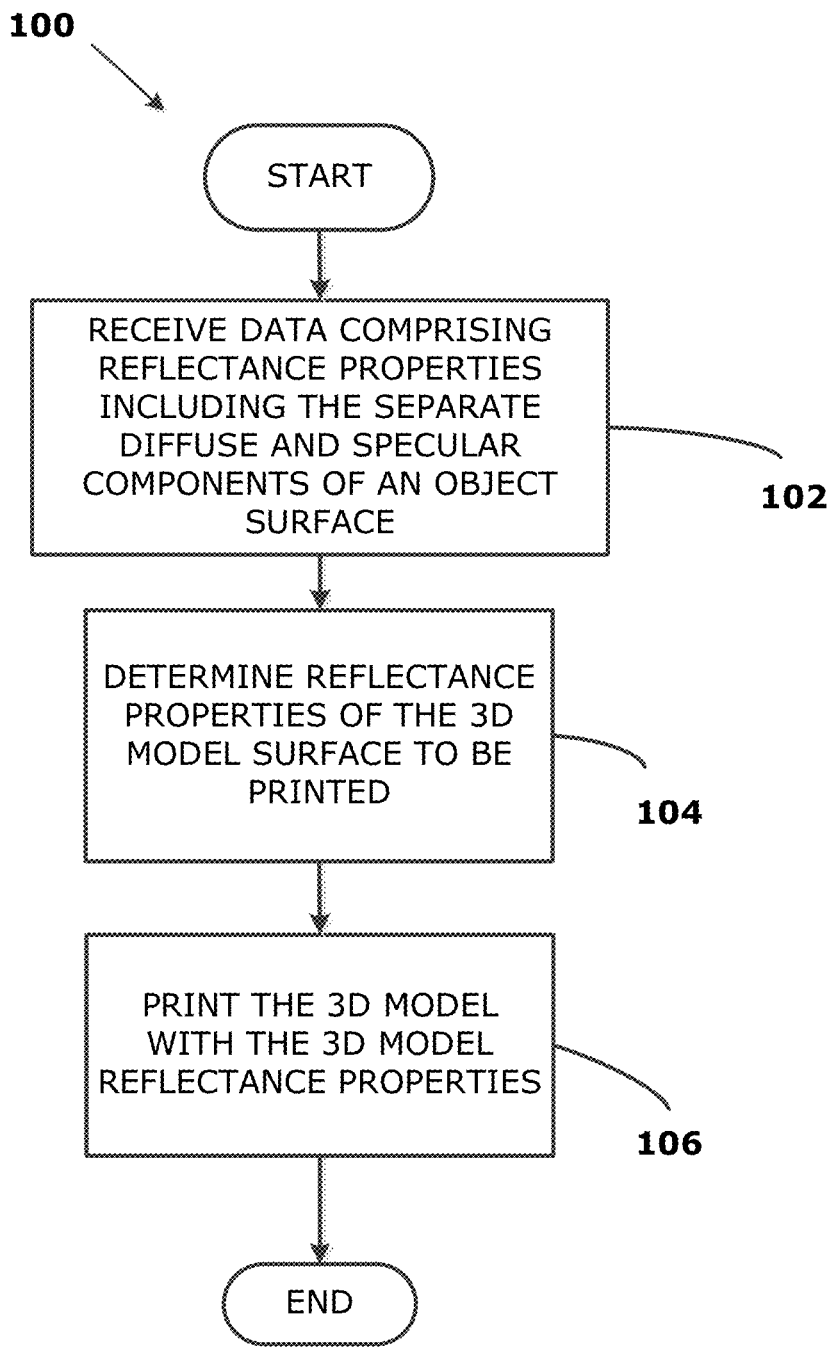
FIG. 1 shows a flowchart that details a method of generating a 3D model of an object in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various models of objects can be obtained from 3D printers by sequential deposition or extrusion of printing materials such as but not limited to resins through inkjet printer heads onto a printer bed. A digital model of an object to be printed can be provided to a processing device connected to the 3D printer. While the 3D models obtained from the 3D printers accurately convey the depth information and provide for robust internal structures, they are generally not configured to convey the light reflectance properties of the actual object which they attempt to model. This is because the currently existing 3D printing technologies can produce 3D models with one or more colors and having diffuse surfaces that are not configured with the true reflectance details of object surfaces which they model. Generally, real-life surfaces rarely reflect light evenly throughout and every highlight in an object is a reflection of a light source. Hence, when an image of an object is captured via an imagining system and a 3D printed model is generated therefrom, the color and the specular components of the object are not properly differentiated. Specularity is one way to produce similar details in virtual object models by placing a highlight in the corresponding position such that the virtual object reflects the virtual light. For example, while a model of a human face printed with a 3D printer can convey the color of the various parts such as color of the eyes, hair, facial skin and lips, it does not accurately convey the reflectance properties of the various parts. The model generally fails to convey the shininess of the eyes or the tip of the nose being shinier than other portions of the face and the like.

Embodiments are described herein for enabling generation of 3D models that accurately convey not only the depth information or geometry of the objects they model but also convey the reflectance details of the surfaces of the objects they model. Separate specular and diffuse components of the object surface reflectance are received in some embodiments. Models generated from such data can more accurately convey the object surface reflectance properties such as color and specular details.

FIG. 1 is flowchart 100 that details an example of a method of generating a 3D model of an object in accordance with some embodiments. The method begins at 102 wherein data comprising reflectance properties of an object surface is received by a processor communicatively coupled to a printing device. In some embodiments, the processor can be comprised in a computing device that is communicatively coupled to the printing device. For example, the computing device can be a stand-alone personal computing device such as but not limited to a desktop or laptop computer driving a desktop 3D printer such as a MAKERBOT REPLICATOR 2. In some embodiments, the computing device with the processor can be an integral part of a larger printing device so that the computing device cannot be separated from the printing device such as industrial grade 3D printers.

Images of objects can be obtained from imaging equipment such as a light stage using cross-polarized light. Polarized light used in cameras enables separation of specular and diffuse components of the light reflected by the object surface. The specular component can be recorded in representations such as a specular map which is a deep gray scale map with shades representing object surface reflection varying from pitch black to pure white. The diffuse component can be a mixture of RGB values and has certain characteristics such as but not limited to absence of shadows. When a model is generated from such disparate diffuse and specular components, the surface reflectance properties of such a 3D model better mimic the reflectance properties of the actual object surface as the color object surface information obtained from the diffuse component while the specularity of the object surface is obtained from the specular component.

In some embodiments, data received at 102 can comprise the surface reflectance properties recorded as one or more of a diffuse map and a specular map of the object surface. The diffuse and specular maps of an object can be obtained by processing an image of the object via software such as but not limited to Maya, PHOTOSHOP, CRAZY BUMP or ShaderMap and the like. Based on the RGB values of the diffuse map and the values of the shades obtained from the specular map for the various portions of the object surface, the corresponding reflectance properties for the surface of a 3D model to be printed are determined at 104. As described supra, the determination can be based on the pixel values of the specular map wherein a higher value of a pixel in the specular map indicates a shinier surface while a lower pixel value represents a more diffuse surface. Accordingly, embodiments described herein enable driving a 3D printer to generate a model of an object based on reflectance values as obtained from its diffuse and specular maps. In addition to the color, the 3D printer also configures the 3D model surface to comprise a glossy finish on portions of the model surface corresponding to the whiter areas of the specular map. Similarly, the portions of the model surface corresponding to the darker areas of the specular map may not receive the specular highlights and are left with a more diffuse finish.

At 106, a 3D model of the object is generated so that the surface of the 3D model comprises the determined 3D model reflectance properties corresponding to the received object reflectance properties. Therefore, a model of a human face generated at 106 in accordance with embodiments described herein would show not only the color information but also the light reflection from glossier portions of the face such as the eyes, teeth, hair, tip of the nose, forehead and the like while other areas or portions of the face are configured with a more diffuse surface. When printed with colors and specular details corresponding to the actual face, the model accurately represents the face. Such embodiments can be used for generating life-like toys, figurines or other objects that look superior due to their more accurate reflectance properties.

Figure 2:
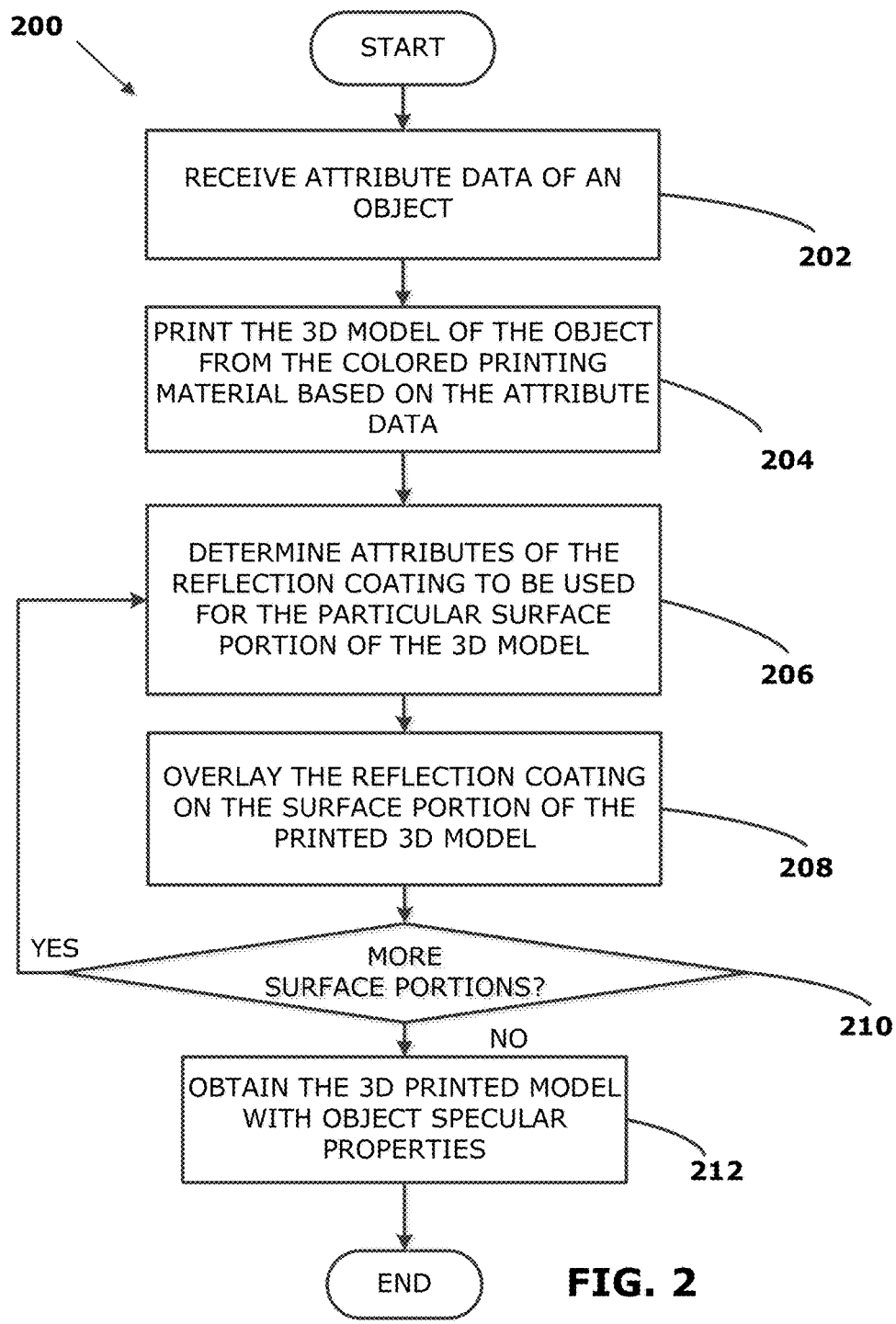
FIG. 2 is a flowchart that illustrates the details of a method of generating a 3D model of an object in accordance with embodiments detailed herein.

FIG. 2 is a flowchart 200 that illustrates the details of a method of generating a 3D model of an object in accordance with embodiments detailed herein. The model can comprise one of a 2D or 3D model. The method begins at 202 wherein the attribute data such as the size, color and reflectance properties of the object is received. Such data can include but is not limited to one or more of images and representations such as the diffuse map, the spectral map and/or pelt map of an object to be printed. In some embodiments, one or more of the diffuse map and the spectral map can be configured as a pelt map. At 204, a first 3D model of the object is printed using the appropriate printing material. Materials such as but not limited to colored plastic filaments or powdered resins and the like can be used to print the first 3D model. Filament spools of different sizes and various colors including full color, translucent and specialty pinks, blues, greens and the like can be used. The color to be used for printing the first 3D model can be obtained from the RGB values of the diffuse map in accordance with some embodiments. The 3D model printed at 204 can be configured to convey the color, size, geometrical and other structural information based on the received image and other maps. However, the 3D model obtained at 204 is not configured to convey the reflectance properties of the object surface as obtained for example, from the spectral maps.

In some embodiments, a clear coating can be deposited on the first 3D model that is initially printed with just the diffuse material thereby providing it with the specularity corresponding to the object. Clear coating material can include transparent, colorless plastic material similar to the colored material used for printing the first 3D model. More particularly, at 206, the attributes of the clear coating to be deposited on the 3D printed model are obtained. The attributes can include for example, the amount of coating to be deposited. The attributes can be determined based on the data regarding the reflectance properties obtained at 202. For example, if the data regarding the reflectance properties is obtained from a specular map, a higher pixel value indicates greater reflectance whereas a lower pixel value is indicative of a more diffuse nature of the surface. The attributes of the clear coating to be deposited can be based on the pixel values of the specular map in accordance with some embodiments.

At 208 the clear coating material per the determined attributes is deposited on a surface portion of the first 3D printed model. At 210, it is determined if other surface portions of the first 3D printed model exist which are to receive the clear coating. If yes, the method returns to 206 to determine the attributes of the clear coating to be deposited on the other remaining surface portions of the 3D printed model. It can be appreciated that there might be some surface portions of the 3D printed model wherein no clear coating is deposited and which can remain as a diffuse surface. This can be controlled via setting the attributes such as thickness of the clear coating for such portions to zero. If it is determined at 210 that no more surface portions remain to be processed, the method proceeds to 212 wherein the 3D printed model endowed with specular properties of the object it models is obtained. The procedure detailed in the flowchart 200 aids in producing superior models that convey not only the geometric and depth information of the object but also the reflectance properties of the object surfaces. It can be appreciated that the model obtained at 212 can be the same size as the object or it can be scaled to a different size based on the received attributed information.

Figure 3:
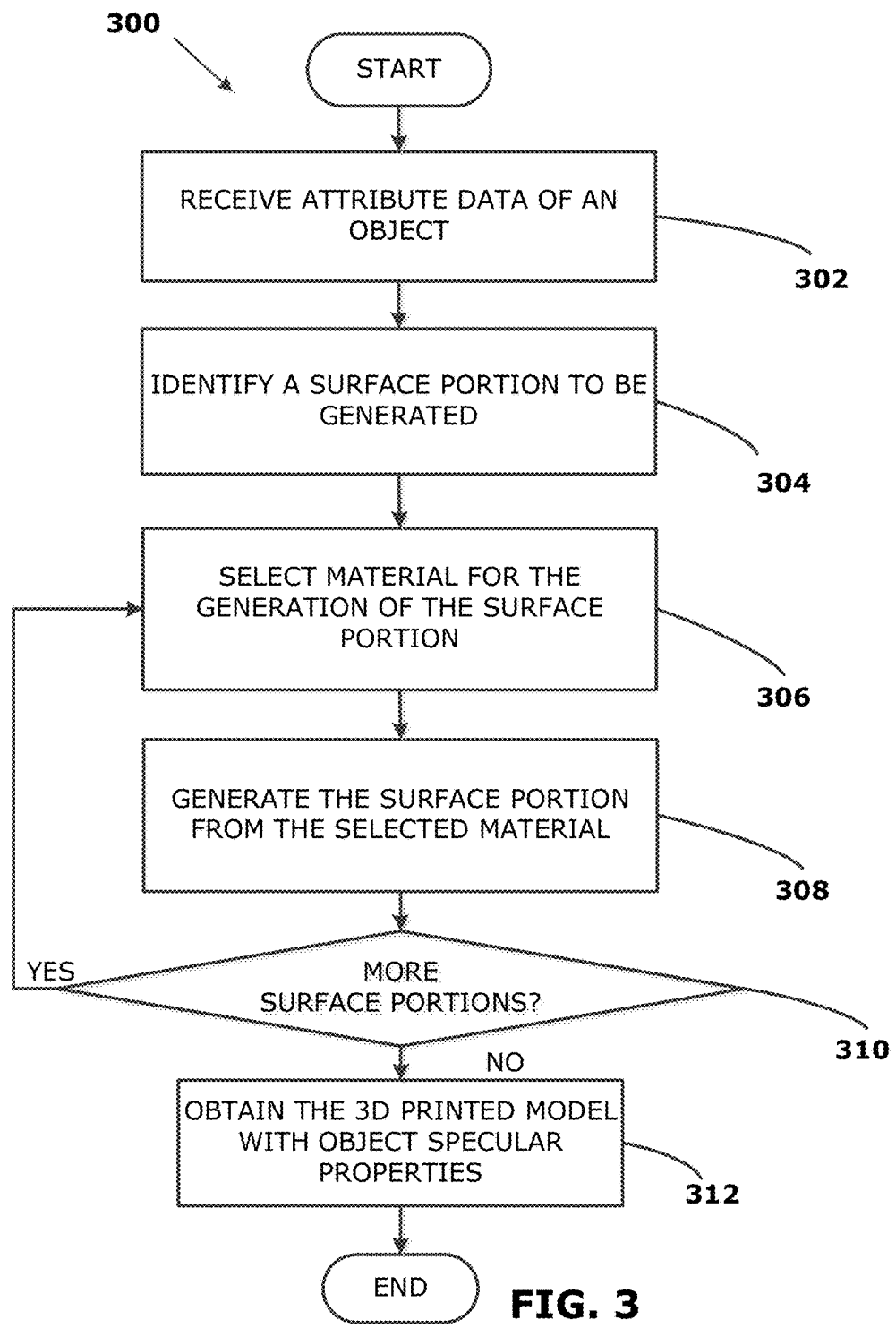
FIG. 3 is a flowchart that details a method of obtaining a model in accordance with some embodiments.

FIG. 3 is a flowchart 300 that details a method of obtaining a model in accordance with some embodiments. The method begins at 302 wherein the attributes data of an object, for example, a face of a living being whose model is to be printed is received. As discussed herein, the attribute data of the object can comprise but is not limited to size, color, optical data such as reflectance properties comprising specular/diffuse nature of the object surface and the like. As described herein, various portions of the model can have varying properties based on the object reflectance properties. For modeling a face of the living being, in addition to different colors for the different facial features, the model can be configured to convey the different reflectance properties of the different facial features. In some embodiments, the reflectance properties can comprise not only data indicative of the color but also data indicative of the specularity or shininess of the object surface. A model of the face generated from such data can be configured with features wherein the eyes, teeth, hair or even tip of the nose are shinier than other portions of the object surface such as, the cheeks. In some embodiments, the attribute data can be obtained as one or more of a diffuse map, a specular map or a pelt map. The diffuse map can comprise the RGB values to be used for the object surface while the specular map comprises a representation of the reflectance properties such as the shininess of the object surface. In addition, the attribute data can comprise a pelt map of the object surface. Of course, any printable object can be printed according to the disclosure herein and is not limited to faces.

At 304, one or more surface portions to be printed is identified. In some embodiments, the portion to be printed can be identified based attributes of the object surface. By the way of illustration and not limitation the portions to be printed can be identified based on boundaries between different portions of the object surface that have different colors, surface finish such as smooth/rough or other attributes. The boundary or boundaries where a change of attribute occurs can be used to demarcate different portions to be printed. In some embodiments, the different portions to be printed can be identified based on the printing process executed by the printing device. The printing process can be configured to identify multiple hypothetical portions on the entire surface to be printed. This enables printing more than one portion of the object surface at any given time via ejecting the respective printing material from a plurality of printer nozzles.

At 306 the material to be used for generation of the one or more portions of the model is selected. The selection of material at 306 occurs based on the attributes of portion to be printed. The attributes can comprise color, object surface quality and reflectance properties such as the specularity or shininess of the object surface. The RGB values of the material to be used for printing the model can be obtained, for example, from the diffuse map. In some embodiments, different portions of the object surface can have the same color but different levels of specularity so that different materials are selected for generating such portions. If the portion of the object surface to be printed is diffuse, then printing material such as the plastic filaments generally used in 3D printers can be employed. If the portion of the object surface to be printed is specular or has certain shininess to it, then printing material that imparts to be model, not only the color but also the reflection that causes the shininess should be used. Such material can be obtained for example, via mixing a diffuse color material with a clear coating material. In some embodiments, such printing material can be produced at a pre-processing stage and loaded into the printer for generating the 3D model.

The portion of the 3D model surface is generated from the selected material at 308. At 310 it is determined if further portions of the 3D model remain to be printed or if the entire 3D model has been printed. If further portions remain to be printed, the method returns to 304 for the identification of the next portion that is to be printed. Steps 306, 308 and 310 are executed until all the surface portions of the entire 3D model are generated. If it is determined at 310 that there are no more portions to be printed, the method moves to 312 wherein the generation of the 3D model is complete. The 3D model printed in accordance with this embodiment, includes not only the depth and geometric information of the object but also the color and the specular information of the object surface since the material selection for printing is based on the reflectance properties.

Figure 4:
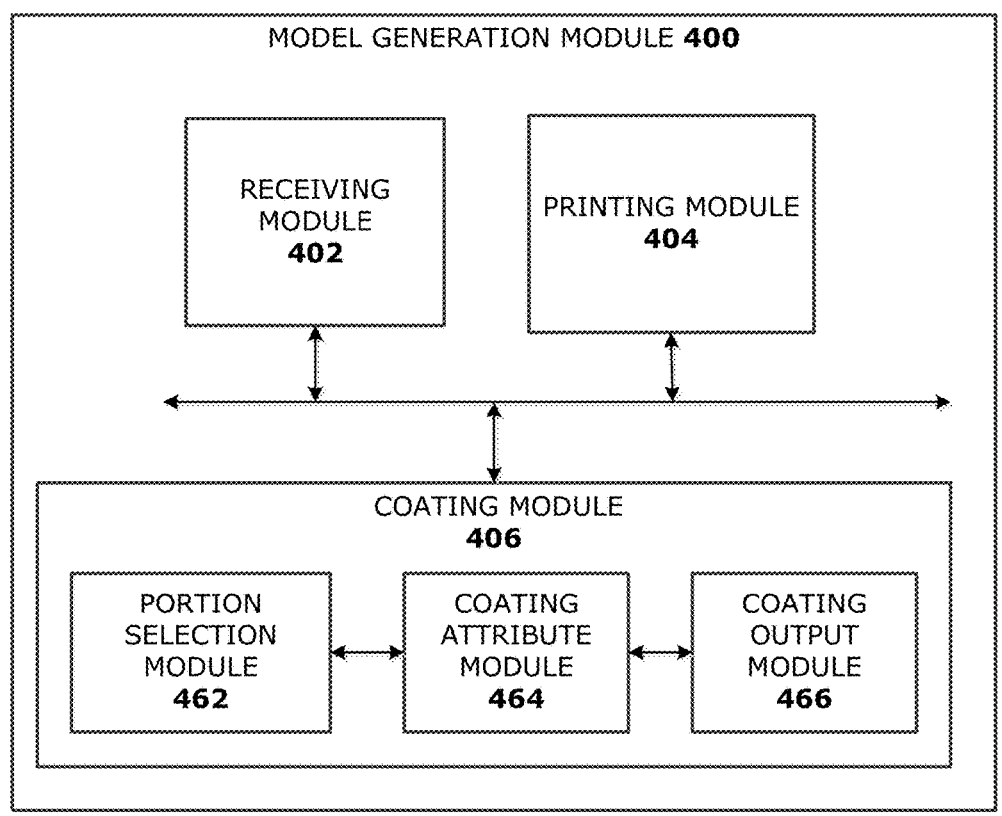
FIG. 4 is a schematic diagram of a model generation module configured to generate 3D models of objects in accordance with embodiments described herein.

FIG. 4 is a schematic diagram of a model generation module 400 configured to generate 3D models of objects in accordance with embodiments described herein. The module can be a set of processor-readable instructions or programming logic stored on a processor-readable medium comprised in a computing device that is communicatively connected to the printer. The instructions from the computing device can be configured to provide the necessary attributes to and drive the printer to generate the 3D model in accordance with embodiments described herein. The model generation module 400 comprises a receiving module 402 that is configured to receive attributes of the object whose model is desired. The attributes can comprise size, shape, scale if any, color, object surface reflectance properties and the like. In some embodiments, the scale can include information regarding the size of the model as compared to the actual size of the object. If no explicit scale information is provided, the printer can default to a predetermined scale for the production of the model. In some embodiments, the object surface reflectance properties can comprise one or more of the diffuse and spectral data and/or pelt maps.

The printing module 404 is configured to print a first 3D model in accordance with the attribute data obtained by the receiving module 402. The first 3D model in some embodiments is printed using printing material such as but not limited to plastic filaments. The color of the printing material can be selected based on the diffuse component of the object surface. The first 3D model is therefore configured to convey the geometry, size, depth and/or color information of the object. However, the first 3D model obtained from such materials without additional processing has a diffuse surface that is not configured to convey specularity of the object surface to a user who views it.

The coating module 406 further comprised in the model generation module 400 comprises instructions that causes the printer to overlay a transparent coating material on the first 3D model. An outer surface of the first 3D model is therefore endowed with specular properties of the object's outer surface. Although the process executed by the model generation module 400 is described such that different surface portions of the first 3D model are serially processed, it can be appreciated that such processing can be executed in parallel wherein a plurality of surface portions of the first 3D model are simultaneously processed. The coating module 406 further comprises a portion selection module 462, a coating attribute module 464 and a coating output module 466. The portion selection module 462 selects a particular portion of the surface of the first 3D model for overlaying a coating that endows the selected portion with specular properties of the corresponding surface portion of the object being modeled by the first 3D model. In some embodiments, different portions of the object surface can be identified via different identification indicia such as color as discussed supra. In some embodiments, the object surface from the specular map can be hypothetically divided into a plurality of portions each of which can be identified via a unique id. The unique id can be used by the portion selection module 462 to identify the corresponding portion of the 3D model surface.

Based on the selected portion of the 3D model surface, the coating attribute model 464 determines the attributes of the coating material to be overlaid on different portions of the first 3D model. The attributes of the coating material are based on the specular data or shininess of that particular 3D model surface that is to be coated. The attributes of the coating material can comprise but are not limited to the specularity of the coating material, the thickness of the coating material and the coating material itself if there are different coating materials available for selection. The information regarding the selected coating material and its attributes can be communicated from the coating attribute module 464 to the coating output module 466. The coating output module 466 provides instructions that drive the 3D printer to emit the coating having particular attributes as communicated by the coating attribute module 464. The coating is emitted by the printer on to the selected surface portion of the first 3D printed model. As each surface portion of the first 3D model is thus treated, a 3D model is obtained which not only comprises the depth, geometric and structural information of the object but such 3D model also comprises complex reflectance properties such as the specularity of the object surface.

Figure 5:
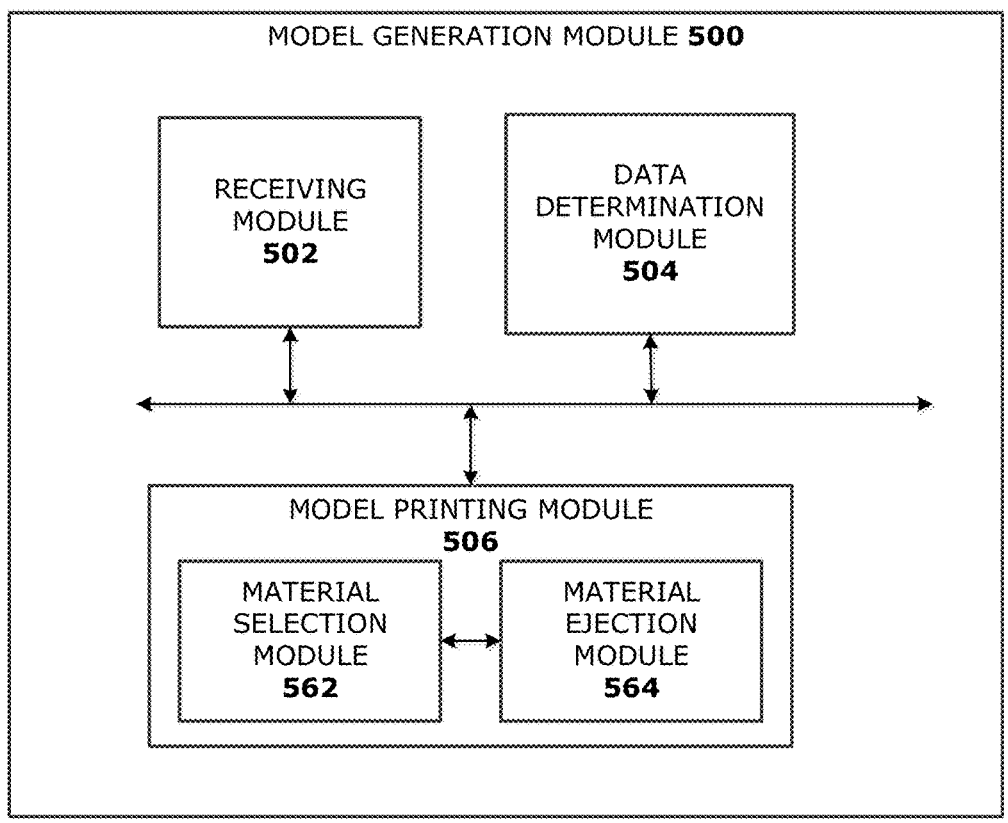
FIG. 5 is a model generation module configured to generate 3D models of objects in accordance with embodiments described herein.

FIG. 5 is a model generation module 500 configured to generate 3D models of objects in accordance with embodiments described herein. The module can be a set of processor-readable instructions or programming logic stored on a processor-readable medium comprised in a computing device that is communicatively connected to the printer. The instructions from the computing device can be configured to provide the necessary attributes to and drive the printer to generate the 3D model in accordance with embodiments described herein. The model generation module 500 comprises a receiving module 502 that is configured to receive attributes of the object whose model is desired as detailed supra with respect to the receiving module 402. The received attributes can comprise size, shape, scale if any, color, object surface reflectance properties and the like. In some embodiments, the object surface reflectance properties can comprise spectral data and/or pelt maps.

The data determination module 504 determines the attributes of a portion of the model to be printed based on the attributes of the object surface as obtained by the receiving module 502. Such attributes of the model portion can comprise but are not limited to size, shape, scale if any, color, object surface reflectance properties and the like. The attributes of the model portion to be printed are communicated to the model printing module 506 which is configured to generate the portion of the model based on the determined model portion attributes.

The model printing module 506 further comprises a material selection module 562 and a material ejection module 564. In an embodiment, the material selection module 562 is configured to select a material for printing based on the attributes of the model portion to be printed. Different materials that endow the model's outer surface with properties ranging from being completely diffuse to highly specular can be made available for selection by the material selection module 562. For example, based on a combination of attributes such as the color (RGB values) from the diffuse map and pixel values from the specular map, selection can be made from a material that imparts a matte finish or a material that can have the same color but imparts a more glossy finish. Such glossy materials can be produced via mixing matte-finish materials with transparent, specular materials. In some embodiments, the 3D printer can be pre-loaded with the range of desired materials based on the object surface properties provided to the receiving module 502. The information regarding the pre-loaded materials can be provided to the material selection module 562 so that appropriate materials can be selected from the finite number of pre-loaded materials available for generating the model. In some embodiments, the materials for printing can be generated at the 3D printer via mixing a clear coating material with a colored diffuse material based on the instructions from the model printing module 506.

The material ejection module 564 includes instructions that cause the printer nozzles to eject the selected materials on to the printer bed to build the portion of the model. In embodiments that involve generating a mixture of the clear coating material with the colored diffuse material, a plurality of printer nozzles can be activated to eject the materials simultaneously or sequentially onto selected areas of the printer bed. The relative proportion of the clear, specular material versus the colored material ejected can be based on the respective specular data corresponding to the surface portion being printed. Upon the completion of the portion, a subsequent portion of the model can be selected to continue the model generation process. The selection and ejection processes can be repeated until the final portion of the model is built. As 3D printing is an additive process, the ejected material "piles up" or is built on the printer bed resulting in the final 3D printed model. In this case, the model generation process is a single step process wherein glossy material is built into the model as opposed to being overlaid on it as described supra, with respect to FIG. 4. Toys, collectibles and the like obtained by such processes have improved appearance as compared to existing models as a result of being endowed with reflectance properties of the object surface.

Figure 6A:
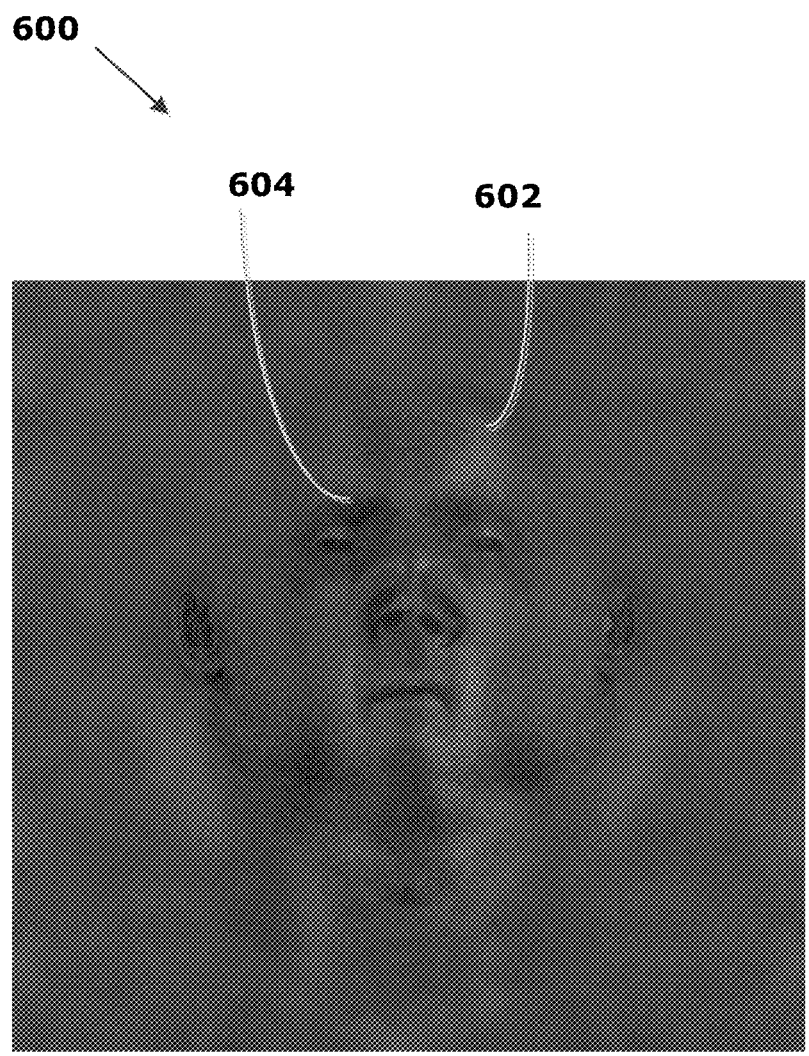
FIGS. 6A and 6B are pelt maps that show separate diffuse and specular data of an object, for example, the face of a person.
Figure 6B:
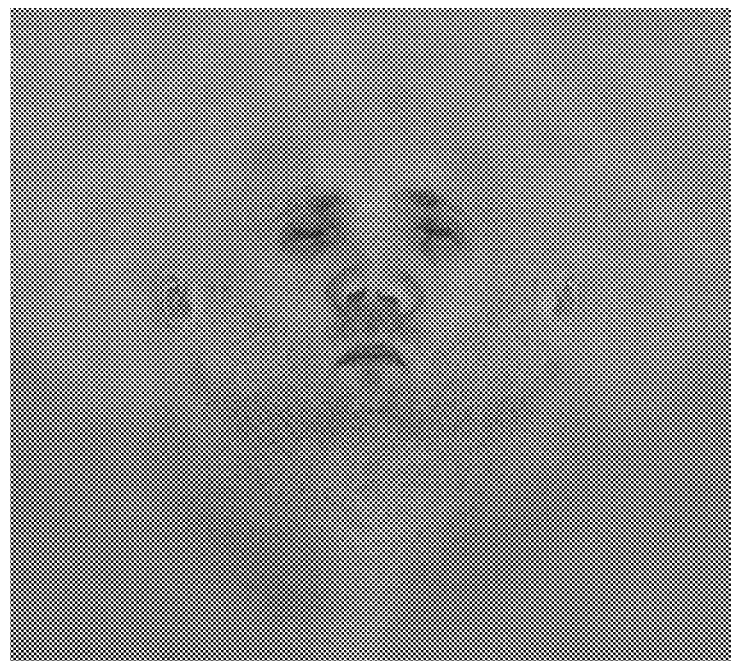

FIGS. 6A and 6B show pelt maps 600 and 650 in accordance with some embodiments. FIG. 6A is a pelt map 600 that shows specular data of an object, for example, the face of a person. A portion of the object surface, for example, the forehead region 602 of the pelt map 600 is whiter or looks more glossier/reflective than the other portions of the object surface, such as the eyebrow region 604. The specular data of the face can comprise pixel values of the various facial regions as indicated in the map 600. For example, the pixel values of the forehead region 602 are higher than the pixel values of the eyebrow region 604. When generating a 3D model from the pelt map 600, a correspondence between the surface portions of the 3D model to be printed and the portions of the face in the pelt map 600 can be established in order to determine the specular data of the various surface portions of the 3D model to be printed. The surface portion of the 3D model corresponding to the forehead region 602 can have reflectance properties that are indicative of greater specularity as compared to the reflectance properties of the eyebrow region 604. As above, the teaching herein is not limited to faces.

Accordingly, glossier materials can be used for printing the forehead region 602 of the 3D model while more diffuse material can be used for generating the eyebrow region 604. In some embodiments, the 3D model with a diffuse surface is generated and a glossy material is overlaid over the forehead region 602 while the eyebrow region receives no glossy material thus conveying the specular data of the actual face. In some embodiments, glossy material is used to generate specular or shinier regions such as the forehead 602 while more diffuse material or a material that imparts a matte finish is used for the eyebrow region 604. In the latter case, the specularity is built into the model as opposed to being overlaid on it.

FIG. 6B is a pelt map 650 that shows the diffuse component of the object surface in accordance with one embodiment. The pelt map 650 includes an image of the object surface that is devoid of specularity and/or shadows that are normally associated with real-world surfaces. The color of the 3D model to be generated can be obtained for example, via the RGB values of pixels in the diffuse map 650.

Figure 7:
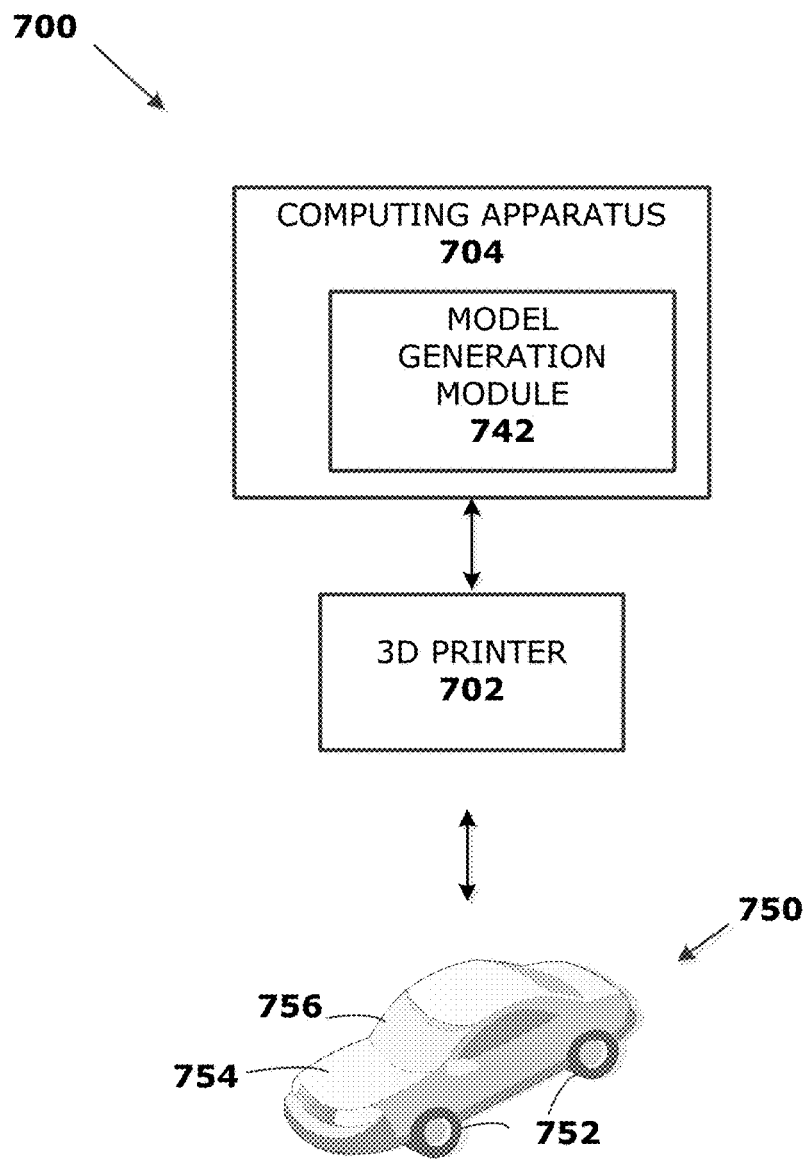
FIG. 7 is a schematic diagram that illustrates an apparatus for the generation of 3D models in accordance with embodiments described herein.

FIG. 7 is a schematic diagram that illustrates an apparatus 700 for the generation of 3D models in accordance with embodiments described herein. The apparatus 700 comprises a 3D printer 702 communicatively coupled to a computing device 704. In some embodiments, the 3D printer 702 and the computing device 704 can be integral, inseparable unit. In some embodiments, the 3D printer 702 and the computing device 704 can be separate units communicatively coupled to each other. The computing device 704 further comprises the model generation module 742 which is configured to generate 3D printed models. In some embodiments, the model generation module 742 comprises modules similar to the model generation module 400 and generates 3D models with specular data by overlaying coating material as disclosed by the process 200 detailed in FIG. 2. In some embodiments, the model generation module 742 comprises modules similar to the model generation module 500 and generates 3D models with specular data by overlaying coating material as disclosed by the process 300 detailed in FIG. 3.

A real-world 3D printed model 750 can be generated by the 3D printer 702 in accordance with the embodiments described herein. The 3D model 750 can be generated from attributes obtained from an image of a real car, for example. Various surface portions of the model 750 are configured with differing reflectance properties that correspond to those recorded in the image of the car. The surfaces such as 752 of the 3D model 750 are generated with material that conveys the diffuse nature of the car tire surfaces while the surfaces 754 and 756 are configured to convey the specular nature of the corresponding surfaces of the actual car. The 3D printed model 750 therefore conveys not only the geometric or structural details of the car but also conveys reflectance properties that not only include the color but also the specular details of the various surfaces of the car.

Figure 8:
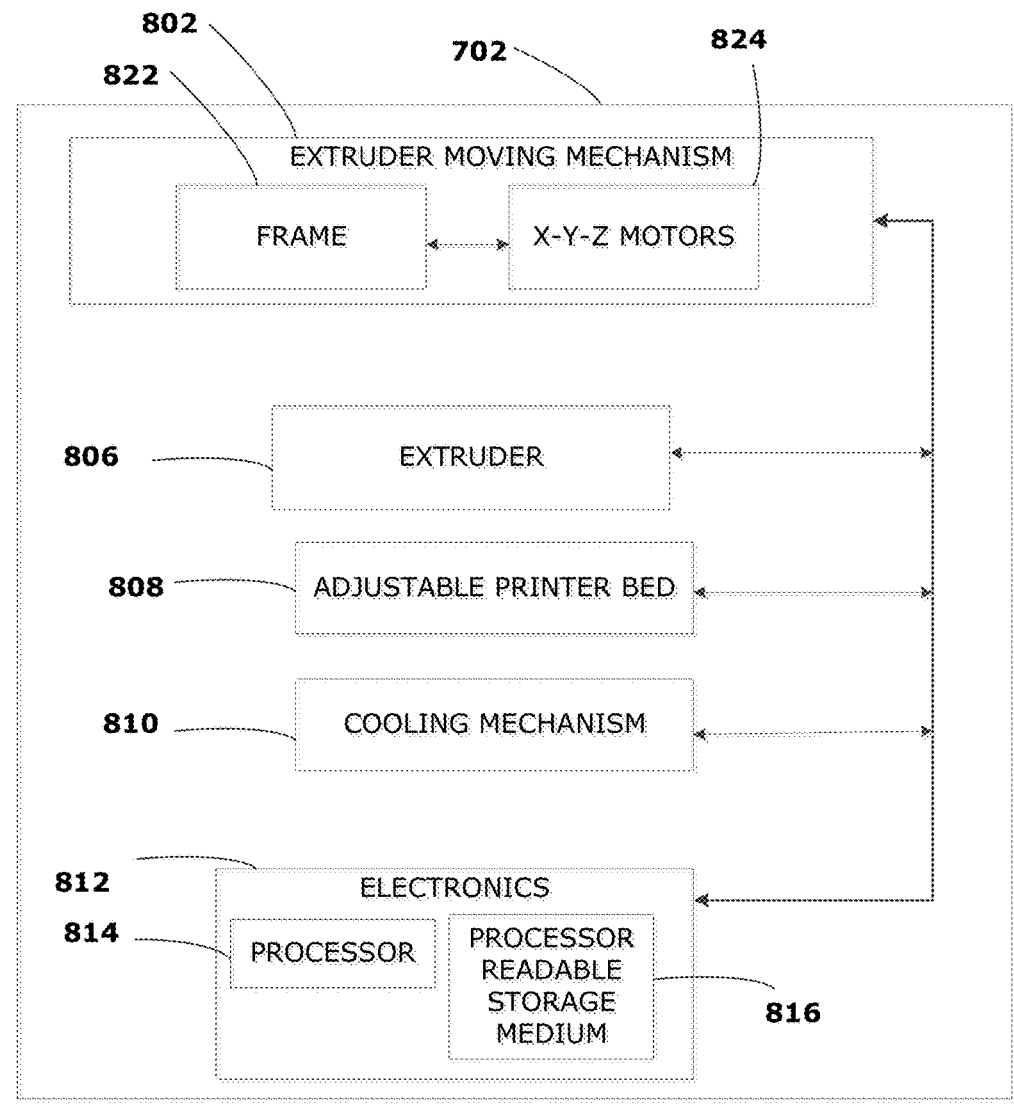
FIG. 8 is a schematic block diagram of a 3D printer for printing 3D models in accordance with some embodiments described herein.

FIG. 8 is a block diagram showing the various modules of a 3D printer 702 for printing 3D models in accordance with some embodiments described herein. It can be appreciated that the block diagram is shown herein only by the way of illustration and not limitation and that other 3D printers with more or less parts can be used to obtain 3D models in accordance with embodiments described herein. The 3D printer 702 can be connected to a controller, such as, a computing device 704 that provides the software for generation and/or selection of the models to be printed. Many of the 3D printers utilize additive manufacturing techniques to turn software entities such as CAD files into tangible objects. As a result professional software is needed to create meticulously accurate designs. Specialized 3D printing software packages are available that enable generating the models on a display screen of the computing device 704. Based on the model generated/selected by the user, the computing device 704 can control the 3D printer 702 to produce or print the model.

The electronics 812 of the 3D printer 702 comprises at least a processor 814 and a non-transitory processor or computer readable non-transitory storage medium 816. The processor 814 controls the various parts of the 3D printer 800 based on the programming logic stored on the non-transitory storage medium 816 to produce 3D printed models in accordance with embodiments described herein. The extruder 806 is made up of an extruding mechanism comprising a tank to contain the 3D printing ink which can includes printing materials such as but not limited to plastic filaments or colored resins and a nozzle to extrude the 3D printing ink to produce the 3D printed model. In some embodiments, the electronics 812 of the 3D printer 702 is programmed to enable the extruder 806 to coat the outer surface of the 3D model being printed. In some embodiments, the electronics 812 of the 3D printer 702 is programmed to select particular printing materials print the 3D model with the selected materials.

The adjustable printer bed 808 in combination with the extruder moving mechanism 802 enables 3D printing by the extruder 806. The extruder moving mechanism 802 can comprise one or more adjustable frames 822 and X-Y-Z motors 824. The extruder 802 is mounted on the frames 822 that are fitted with the X-Y-Z motors that enable moving the extruder 806 along one or more of the X-Y-Z axes on the frames 822. In addition, the adjustable printer bed 808 onto which the extruder 806 emits the ink can be adjusted adding another dimension of flexibility to the 3D printer 702. A cooling mechanism 810 such as a fan is also included in the 3D printer 702 so that upon being printed, the 3D model is cooled. The 3D printer 702 is therefore able to print realistic models with depth information and reflectance properties in accordance with embodiments described herein.

Figure 9:
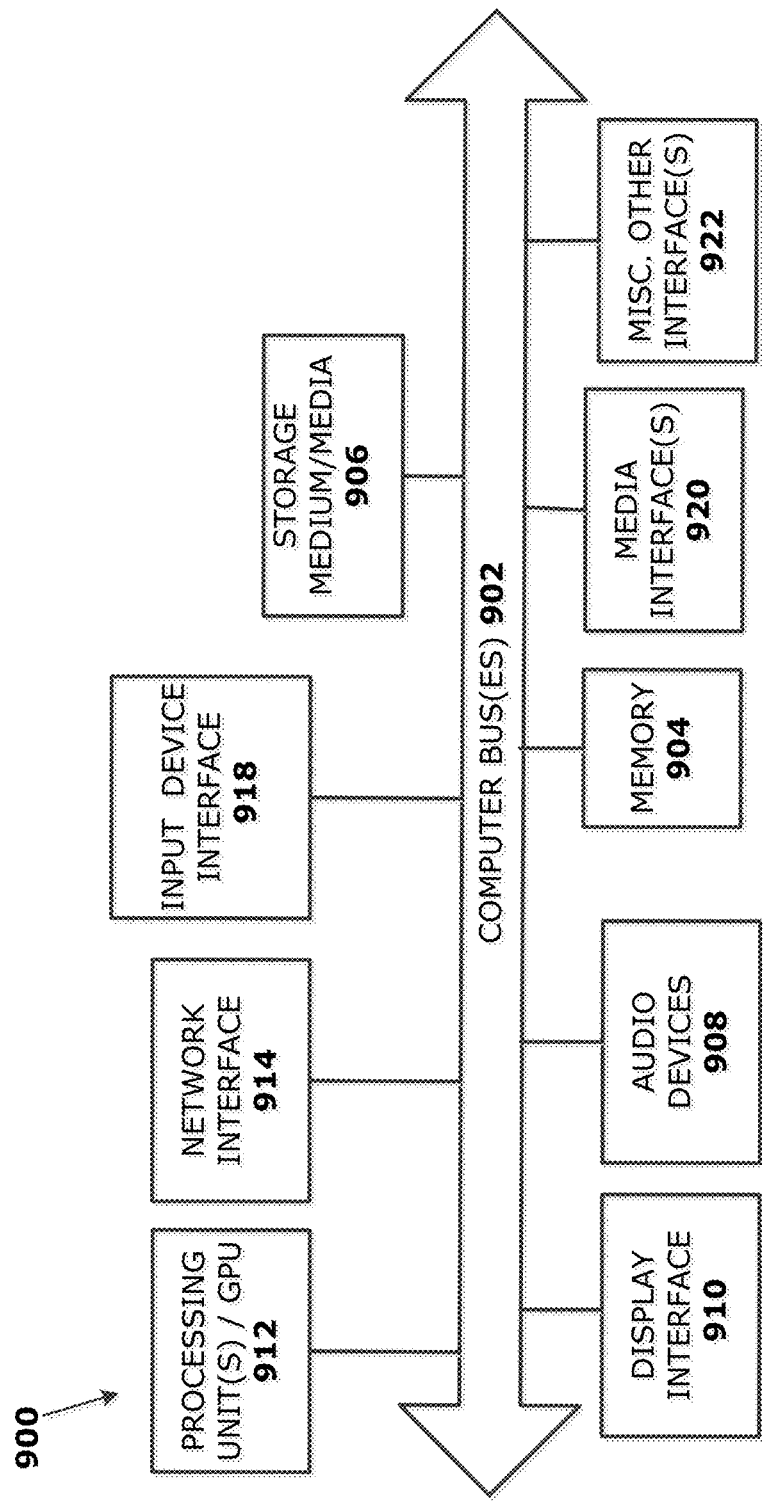
FIG. 9 illustrates internal architecture of a computing device in accordance with embodiments described herein.

FIG. 9 is a schematic diagram of the internal architecture of a computing device 900 in accordance with embodiments described herein. The computing device 900 includes one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 920 which is an interface for a drive that can read and/or write to media including removable media such as floppy, CD-ROM, DVD, etc., media, display interface 910 as interface for a monitor or other display device, input device interface 918 which can include one or more of an interface for a keyboard or a pointing device such as but not limited to a mouse, and miscellaneous other interfaces 922 not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code or logic, and/or instructions for computer-executable process steps, incorporating functionality described herein, e.g., one or more of process flows described herein. CPU 912 first loads instructions for the computer-executable process steps or logic from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps. In some embodiments, the memory can comprise model generation module 742 in accordance with embodiments described herein. The processing units 912 execute instructions comprised in the model generation module 742 to drive the 3D printer 702 to produce 3D models in accordance with embodiments described herein.

Persistent storage medium/media 906 are computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, metadata, playlists and other files. Persistent storage medium/media 906 can further include program modules/program logic in accordance with embodiments described herein and data files used to implement one or more embodiments of the present disclosure.

For the purposes of this disclosure a computer readable medium stores computer data, which data can include computer program code that is executable by a computer, in machine readable form. By way of example, and not limitation, a computer readable medium can comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module can be stored on a computer readable medium. Modules can be integral to one or more servers, or be loaded and executed by one or more servers. One or more modules can be grouped into an engine or an application.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, at a printing device comprising a processor, reflectance properties comprising at least disparate components associated with diffuse data and specular data of an object surface;
determining, by the device using the object specular data, 3D model specular data for a surface of a 3D model of the object, the determination of the 3D model specular data based on identifying one or more portions of the object surface based on boundaries between different portions of the object surface that have different attributes and determining correspondence of respective 3D model specular data of a surface portion of the 3D model with respective object specular data of a corresponding portion of the object surface; and
generating, by the device, the 3D model of the object, the surface of the 3D model being constructed by the device to comprise the 3D model specular data corresponding to the object specular data.

2. The method of claim 1, determining the specular data for each surface portion of the 3D model further comprises:
receiving, by the processor, at least two pelt maps of the object surface; and
determining, by the processor from the one of the received pelt maps, the 3D model specular data;
determining, by the processor, from another one of the pelt maps, color information of the 3D model.

3. The method of claim 2, generating the 3D model further comprises:
printing, by the processor, the 3D model of the object based on the pelt maps.

4. The method of claim 1, generating the 3D model based on the 3D model specular data further comprises:
printing, by the device, a first 3D model of the object comprising the surface portions, the color of the surface portions based on the diffuse data; and
overlaying, by the device, a reflective coating on the surface portions of the first 3D model based on the respective 3D model specular data of the 3D model surface portion being printed.

5. The method of claim 4, overlaying the coating on the first 3D model further comprises:
determining, by the device, a reflectance of the coating to be applied to the surface portions of the first 3D model, the respective reflectance of coating applied to the surface portions being proportional to the respective 3D model specular data.

6. The method of claim 1, generating the 3D model further comprises:
selecting, by the device for each surface portion of the 3D model, at least one printing material from a plurality printing materials, the selection of the printing material based at least on the respective diffuse data and specular data of the surface portion of the 3D model being generated.

7. The method of claim 6, further comprising:
printing, by the device, each surface portion of the 3D model of the object from the selected printing material.

8. The method of claim 6, further comprising:
generating, by the device, the at least one printing material via a combination of a clear printing material with a colored printing material.

9. The method of claim 8, generating the printing material further comprises:
combining, by the device, the clear printing material and the colored printing material in a proportion based on the respective specular data corresponding to the surface portion being printed.

* * * * *